United States Patent [19]

Sasaki et al.

[11] Patent Number: 5,330,679

[45] Date of Patent: * Jul. 19, 1994

[54] NEMATIC LIQUID-CRYSTAL COMPOSITION FOR ACTIVE MATRIX APPLICATION

[75] Inventors: Kei Sasaki, Tenri; Masako Okada, Ikoma; Shuichi Kohzaki, Nara; Fumiaki Funada, Yamatokooriyama; Bernhard Rieger; Hiroshi Numata, both of Yokohama, all of Japan; Reinhard Hittich, Modautal, Fed. Rep. of Germany; Herbert Plach, Darmstadt, Fed. Rep. of Germany; Thomas Geelhaar, Mainz, Fed. Rep. of Germany; Eike Poetsch, Mühltal, Fed. Rep. of Germany; Volker Reiffenrath, Rossdorf, Fed. Rep. of Germany

[73] Assignees: Merck Patent Gesellschaft mit Beschrankter Haftung, Darmstadt, Fed. Rep. of Germany; Sharp Corporation, Osaka, Japan

[*] Notice: The portion of the term of this patent subsequent to May 3, 2011 has been disclaimed.

[21] Appl. No.: 845,108

[22] Filed: Mar. 3, 1992

[30] Foreign Application Priority Data

Mar. 4, 1991 [EP] European Pat. Off. ........ 91103200.1

[51] Int. Cl.$^5$ ............................................. C09K 19/30
[52] U.S. Cl. ............................................... 252/299.63
[58] Field of Search ...................... 252/299.01, 299.63

[56] References Cited

U.S. PATENT DOCUMENTS 5,032,313  7/1991  Goto et al. ...................... 252/299.63

FOREIGN PATENT DOCUMENTS 387032  9/1990  European Pat. Off. .

Primary Examiner—Shean Wu
Attorney, Agent, or Firm—Millen, White, Zelano, & Branigan

[57] ABSTRACT

The invention relates to a nematic liquid-crystal composition for active matrix displays with high voltage holding ratio and extremely good low temperature stability.

3 Claims, No Drawings

NEMATIC LIQUID-CRYSTAL COMPOSITION FOR ACTIVE MATRIX APPLICATION

SUMMARY OF THE INVENTION

The invention relates to a nematic liquid-crystal composition based on terminally and laterally fluorinated compounds. This composition is especially useful for active matrix application.

Active matrix displays (AMD) are highly favored for commercially interesting displays with a high information content. Such AMDs are used for TV application and also for displays with high information content for computer terminals, automobiles and airplanes.

AMDs have non-linear electrical switching elements which are integrated at each picture element. As non-linear driving elements thin film transistors (TFT) [Okubo, U., et al., 1982, SID 82 Digest, pp. 40–41] or diodes (e.g.: metal insulator metal: MIM) [Niwa, K., et al., 1984, SID 84, Digest, pp. 304–307] can be applied. These non-linear driving elements allow use of an electro-optical effect with a rather flat electro-optical characteristic if a good viewing angle characteristic can be obtained. Consequently, a TN-type LC ceil [Schadt, M. and Helfrich, W., 1971, Appl. Phys. Lett., 18, 127] with a twist angle of 90° can be used. To provide good contrast over a wide viewing angle, operation in the first minimum of transmission [Pohl, L., Eidenschink, R., Pino, F. del., and Weber, G., 1980, German Pat., DBP 30 22 818, and 1981, U.S. Pat. No. 4 398 803; Pohl, L., Weber, G., Eidenschink, R., Baur, G., and Fehrenbach, W., 1981, Appl. Phys. Lett., 38, 497; Weber, G., Finkenzeller, U., Geelhaar, T., Plach, H. J., Rieger, B., and Pohl, L., 1988, Int. Syrup. on Liq. Cryst., Freiburg, to be published in Liq. Crys.] is required. These AMDs are very well suited for TV applications and consequently are of high commercial interest. For these applications some physical properties of the liquid crystals become more important than for passive TN displays. Some of the decisive properties for the performance of an AMD are resistivity and stability of the liquid crystal [Togashi, S., Sekiguchi, K., Tanabe, H., Yamamoto, E., Sorimachi, K., Kajima, E., Watanabe, H., Shimuzu, H., Proc. Eurodisplay 84, Sept. 1984: A 210–288 Matrix LCD Controlled by Double Stage Diode Rings, p. 144 ff, Paris; Stromer, M., Proc. Eurodisplay 84, Sept. 1984: Design of Thin Film Transistors for Matrix Addressing of Television Liquid Crystal Displays, p. 145 ff, Paris].

In an AMD the non-linear switching elements are addressed in a multiplex scheme, and charge the electrodes of a pixel in the limited time they are active. Then they become inactive until they are addressed again in the next cycle. Consequently the change of the voltage on an activated (charged) pixel is a nondesired but a very decisive feature of such a display. The discharge of a pixel is determined by two factors. They are the capacity of the electrodes of the pixel and resistivity of the dielectric material between the electrodes, namely the liquid crystal. The characteristic time constant of the decay of the voltage at a pixel (RC-time) has to be significantly bigger than the time between two addressing cycles (tadr.). A parameter frequently used to describe the performance of an AMD is the voltage holding ratio HR of a picture element:

$$HR = \frac{V(to) + V(to + tadr.)}{2V(to)}$$

As the voltage at a pixel decays exponentially, an increase of the holding ratio necessitates liquid crystal materials with exceptionally high resistivities.

There are several points of importance for the resistivity of the liquid crystal inside a display, e.g. orientation layers, curing condition of the orientation material. But by no means less important are the electrical properties of the liquid crystal used. Especially the resistivity of the liquid crystal in the display determines the magnitude of the voltage drop at the pixel.

There is thus still a great need for liquid-crystal composition having a high resistivity and other suitable material properties for use in AMDs such as a broad nematic mesophase range with an extremely low transition temperature smecticnematic and no crystallization at low temperatures.

SUMMARY OF THE INVENTION

The invention has as an object to provide a liquid-crystal composition with a very high resistivity which meets also the other demands.

It has now been found that a nematic liquid-crystal composition based on terminally and laterally fluorinated compounds, characterized in that that it comprises about 8 to 60% by weight of one or more compounds from group 1:

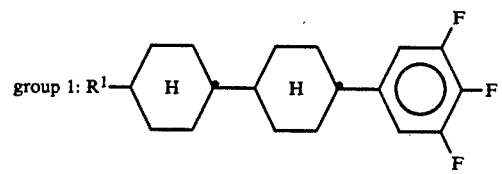

wherein $R^1$ denotes a straight-chain alkyl group of 2 to 7 carbon atoms, about 6 to 80% by weight of one or more compounds from group 2:

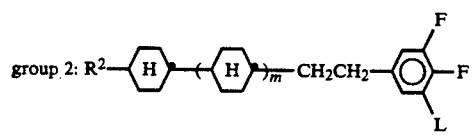

wherein $R^2$ denotes a straight-chain alkyl group of 2 to 7 carbon atoms, L is H or F and m is 1 or 0, about 8 to 60% by weight of one or more compounds from group 3:

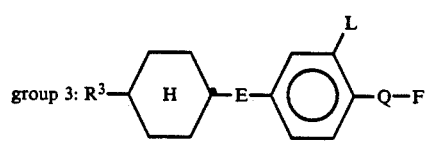

wherein $R^3$ denotes a straight-chain alkyl group of 2 to 7 carbon atoms, E is

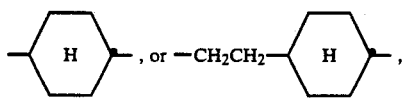

L is H or F and Q is OCF$_2$, OCFH, OCFCl$_1$ or also a single bond, and 0 to 60% by weight of one or more compounds from group 4:

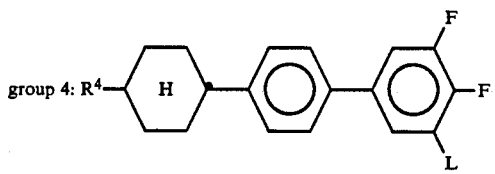

wherein R$^4$ denotes a straight-chain alkyl group of 2 to 7 carbon atoms and L is H or F, is highly suited for AMD application. Very high RC time values can be obtained in AMDs. These compositions also show a reduced viscosity, allow operation in AMDs in the first minimum of transmission and/or do not exhibit any crystallization at −30 °C.

Such compositions preferably contain two, three or four compounds from group 1. Preferred compositions comprise more than 12% by weight of one or more compounds from group 1.

Q is preferably OCF$_2$, OCFH, OCFCl$_1$ or —if L denotes F—also a single bond.

The compounds from groups 1 to 4 are known from the European Patent Applns. 0 387 032 and 0 280 902, the European Patents 0 051 738 and 0 125 653, the International Patent Applications WO 89/02884 and WO 85/04874 and U.S. Pat. No. 4,302,352, U.S. Pat. No. 4,710,315 and U.S. Pat. No. 4,419,264 or can be prepared in analogy to known compounds.

Preferred compositions also comprise one or more compounds from group 0 having two rings:

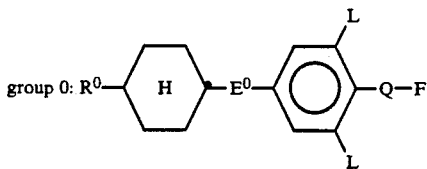

where R$^0$ denotes a straight-chain alkyl group of 2 to 7 carbon atoms, E$^0$ is —(CH$_2$)$_4$—, —(CH$_2$)$_2$—, —CO—O— or a single bond an L and Q are as defined in group 3. Preferably E0 is —(CH$_2$)$_2$ or a single bond, Q is a single bond and one of L is H and the other L is H or F.

The compositions according to this invention preferably comprise 20 to 60% by weight and especially 30 to 55% by weight of components from group 1. The preferred weight percent ranges for the other groups (if present) are as follows:
group 0: 5 to 30%, especially 10 to 25%
group 2: 12 to 80%, especially 15 to 60%
group 3: 12 to 50%, especially 15 to 45%

Preferably the components from groups 1, 2 and 3 form the basis of the claimed compositions and constitute at least 60% (preferably at least 75%) by weigh of the compositions. It is, however, also possible to use besides components from groups 0 to 3 also other LC components in smaller percentages for fine-tuning the claimed compositions.

From many experimental investigations it also resulted that the most efficient compounds from group 4 are those of the formula

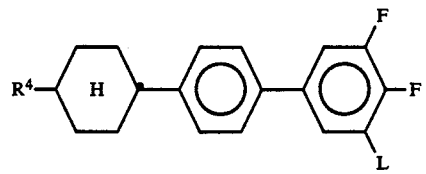

These components are preferably used in an amount of 18 to 60% by weight. L is preferably F.

The preparation of the compositions according to the invention is effected in the conventional manner. In general, the desired amount of the components which is used in the smaller amount is dissolved in the components which constitutes the main constituent, preferably at elevated temperature. If this temperature is chosen to be above the clearing point of the main constituent, the completeness of the process of dissolving can be observed particularly easily.

However, it is also possible to mix solutions of the components in a suitable organic solvent, for example acetone, chloroform or methanol, and to remove the solvent after thorough mixing, for example by distillation under reduced pressure. It is self-evident that with this method it must be ensured that the solvent does not introduce any contaminants or undesirable dopants.

By means of suitable additives the liquid crystal phases according to the invention can be modified in such a way that they can be used in any hitherto disclosed kind of AMD.

Optimization of the mixtures can be performed, in view of the foregoing information, as a matter of routine experimentation by one of ordinary skill in the art.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application EP Application No. 91103200.1, filed Mar. 4, 1991, are hereby incorporated by reference.

EXAMPLES

Example 1

A liquid-crystal composition consisting of
5% of trans-1-p-fluorophenyl-4-n-pentylcyclohexane,
5% of trans-1-p-fluorophenyl-4-n-heptylcyclohexane,
7% of p-[trans-4-(trans-4-ethylcyclohexyl)-cyclohexyl]-trifluoromethoxybenzene
7% of p-[trans-4-(trans-4-propylcyclohexyl)-cyclohexyl]-trifluoromethoxybenzene
7% of p-[trans-4-(trans-4-n-butylcyclohexyl)-cyclohexyl]-trifluoromethoxybenzene 8% of p-[trans-4-(trans-4-n-pentylcyclohexyl)-cyclohexyl]-trifluoromethoxybenzene 8% of 1-[trans-4-(trans-n-propylcyclohexyl)-cyclohexyl]-2-(3,4-difluorophenyl)-ethane, 8% of 1-[trans-4-(trans-n-pentylcyclohexyl)-cyclohexyl]-2-(3,4-difluorophenyl)-ethane, 14% of 4'-(trans-4-n-propylcyclohexyl)-3,4,5-trifluorobiphenyl, 13% of 4'-(trans-4-n-pentylcyclohexyl)-3,4,5-trifluorobiphenyl, 9% of 1-[trans-4-(trans-4-n-propylcyclohexyl)-cyclohexyl]-3,4,5-trifluorobenzene and 9% of 1-[trans-4-(trans-4-n-pentylcyclohexyl)-cyclohexyl]-3,4,5-trifluorobenzene is prepared. Physical parameters are given in the following table.

Example 2

A liquid-crystal composition consisting of

8% of trans-1-p-fluorophenyl-4-n-pentylcyclohexane,

6% of trans-1-p-fluorophenyl-4-n-heptylcyclohexane,

6% of p-[trans-4-(trans-4-ethylcyclohexyl)-cyclohexyl]-trifluoromethoxybenzene,

7% of p-[trans-4-(trans-4-propylcyclohexyl)-cyclohexyl]-trifluoromethoxybenzene, 6% of p-[trans-4-(trans-4-butylcyclohexyl)-cyclohexyl]-trifluoromethoxybenzene, 6% of p-[trans-4-(trans-4-pentylcyclohexyl)-cyclohexyl]-trifluoromethoxybenzene, 8% of 1-[trans-4-(trans-4-propylcyclohexyl)-cyclohexyl]-2-(3,4-difluorophenyl)-ethane, 8% of 1-[trans-4-(trans-4-pentylcyclohexyl)-cyclohexyl]-2-(3,4-difluorophenyl)-ethane, 14% of 4'-(trans-4-propylcyclohexyl)-3,4,5-trifluorobiphenyl, 3% of 4'-(trans-4-pentylcyclohexyl)-3,4,5-trifluorobiphenyl, 9% of 1-[trans-4-(trans-4-n-propylcyclohexyl)-cyclohexyl)-3,4,5-trifluorobenzene and 9% of 1-[trans-4-(trans-4-n-pentylcyclohexyl)-cyclohexyl)-3,4,5-trifluorobenzene is prepared. Physical parameters are given in the following table.

Example 3

A liquid-crystal composition consisting of

5% of trans-1-p-fluorophenyl-4-n-pentylcyclohexane,

5% of trans-1-p-fluorophenyl-4-n-heptylcyclohexane,

6% of p-[trans-4-(trans-4-ethylcyclohexyl)-cyclohexyl]-trifluoromethoxybenzene,

6% of p-[trans-4-(trans-4-propylcyclohexyl)-cyclohexyl]-trifluoromethoxybenzene, 6% of p-[trans-4-(trans-4-butylcyclohexyl)-cyclohexyl]-trifluoromethoxybenzene, 6% of p-[trans-4-(trans-4-pentylcyclohexyl)-cyclohexyl]-trifluoromethoxybenzene, 8% of 1-[trans-4-(trans-4-propylcyclohexyl)-cyclohexyl]-2-(3,4-difluorophenyl)-ethane, 8% of 1-[trans-4-(trans-4-pentylcyclohexyl)-cyclohexyl]-2-(3,4-difluorophenyl)-ethane, 12% of 4'-(trans-4-propylcyclohexyl)-3,4,5-trifluorobiphenyl, 11% of 4'-(trans-4-pentylcyclohexyl)-3,4,5-trifluorobiphenyl, 12% of 1-[trans-4-(trans-4-n-propylcyclohexyl)-cyclohexyl)-3,4,5-trifluorobenzene, 9% of 1-[trans-4-(trans-4-n-pentylcyclohexyl)-cyclohexyl)-3,4,5-trifluorobenzene, 3% of 4'(trans-4-propylcyclohexyl)-3,4-difluorobiphenyl and 3% of 4'(trans-4-pentylcyclohexyl)-3,4-difluorobiphenyl is prepared. Physical parameters are given in the following table.

Example 4

A liquid-crystal composition consisting of

8% of trans-1-p-fluorophenyl-4-n-pentylcyclohexane,

5% of trans-1-p-fluorophenyl-4-n-heptylcyclohexane,

10% of p-[trans-4-(trans-4-ethylcyclohexyl)-cyclohexyl]-trifluoromethoxybenzene, 12% of p-[trans-4-(trans-4-propylcyclohexyl)-cyclohexyl]-trifluoromethoxybenzene, 8% of p-[trans-4-(trans-4-butylcyclohexyl)-cyclohexyl]-trifluoromethoxybenzene, 10% of p-[trans-4-(trans-4-pentylcyclohexyl)-cyclohexyl]-trifluoromethoxybenzene, 6% of 1-[trans-4-(trans-4-propylcyclohexyl)-cyclohexyl]-2-(3,4-difluorophenyl)-ethane, 10% of 4'-(trans-4-propylcyclohexyl)-3,4-difluorobiphenyl, 10% of 4'-(trans-4-pentylcyclohexyl)-3,4-difluorobiphenyl, 9% of 1-[trans-4-(trans-4-n-pentylcyclohexyl)-cyclohexyl)-3,4,5-trifluorobenzene and 12% of 1-[trans-4-(trans-4-n-propylcyclohexyl)-cyclohexyl)-3-fluoro-4-trifluoromethylbenzene is prepared. Physical parameters are given in the following table.

Example 5

A liquid-crystal composition consisting of

13% of trans-1-p-trifluoromethyl-4-n-propylcyclohexane,

10% of p-[trans-4-(trans-4-ethylcyclohexyl)-cyclohexyl]-trifluoromethoxybenzene, 12% of p-[trans-4-(trans-4-propylcyclohexyl)-cyclohexyl]-trifluoromethoxybenzene, 8% of p-[trans-4-(trans-4-butylcyclohexyl)-cyclohexyl]-trifluoromethoxybenzene, 10% of p-[trans-4-(trans-4-pentylcyclohexyl)-cyclohexyl]-trifluoromethoxybenzene, 6% of 1-[trans-4-(trans-4-propylcyclohexyl)-cyclohexyl]-2-(3,4-difluorophenyl)-ethane, 10% of 4'-(trans-4-propylcyclohexyl)-3,4-diifluorobiphenyl, 10% of 4'-(trans-4-pentylcyclohexyl)-3,4-difluorobiphenyl, 12% of 1-[trans-4-(trans-4-n-propylcyclohexyl)-cyclohexyl)-3,4,5-trifluorobenzene and 9% of 1-[trans-4-(trans-4-n-pentylcyclohexyl)-cyclohexyl)-3,4,5-trifluorobenzene is prepared. Physical parameters are given in the following table.

Example 6

A liquid-crystal composition consisting of

8% of trans-1-p-fluorophenyl-4-n-pentylcyclohexane,

4% of trans-1-p-fluorophenyl-4-n-heptylcyclohexane,

10% of p-[trans-4-(trans-4-ethylcyclohexyl)-cyclohexyl]-trifluoromethoxybenzene, 12% of p-[trans-4-(trans-4-propylcyclohexyl)-cyclohexyl]-trifluoromethoxybenzene, 8% of p-[trans-4-(trans-4-butylcyclohexyl)-cyclohexyl]-trifluoromethoxybenzene, 12% of p-[trans-4-(trans-4-pentylcyclohexyl)-cyclohexyl]-trifluoromethoxybenzene,
4 % of 1-[trans-4-(trans-4-propylcyclohexyl)-cyclohexyl]-2-(3,4-difluorophenyl)-ethane,
14% of 4'-(trans-4-propylcyclohexyl)-3,4,5-trifluorobiphenyl,
10% of 4'-(trans-4-pentylcyclohexyl)-3,4,5-trifluorobiphenyl,
10% of 1-[trans-4-(trans-4-n-propylcyclohexyl)-cyclohexyl]-3,4,5-trifluorobenzene and
8% of 1-[trans-4-(trans-4-n-pentylcyclohexyl)-cyclohexyl]-3,4,5-trifluorobenzene is prepared. Physical parameters are given in the following table.

Example 7

A liquid-crystal composition consisting of
5% of trans-1-p-fluorophenyl-4-n-pentylcyclohexane,
6% of trans-1-p-fluorophenyl-4-n-heptylcyclohexane,
8% of p-[trans-4-(trans-4-ethylcyclohexyl)-cyclohexyl]-trifluoromethoxybenzene,
10% of p-[trans-4-(trans-4-propylcyclohexyl)-cyclohexyl]-trifluoromethoxybenzene,
8% of p-[trans-4-(trans-4-butylcyclohexyl)-cyclohexyl]-tri-fluoromethoxybenzene,
10% of p-[trans-4-(trans-4-pentylcyclohexyl)-cyclohexyl]-trifluoromethoxybenzene,
7% of 1-[trans-4-(trans-4-propylcyclohexyl)-cyclohexyl]-2-(3,4,5-trifluorophenyl)-ethane,
7% of 1-[trans-4-(trans-4-pentylcyclohexyl)-cyclohexyl]-2-(3,4,5-trifluorophenyl)-ethafie,
12% of 4'-(trans-4-propylcyclohexyl)-3,4,5-trifluorobiphenyl,
11% of 4'-(trans-4-pentylcyclohexyl)-3,4,5-trifluorobiphenyl,
8% of 1-[trans-4-(trans-4-n-propylcyclohexyl)-cyclohexyl)-3,4,5-trifluorobenzene and
8% of 1-[trans-4-(trans-4-n-pentylcyclohexyl)-cyclohexyl)-3,4,5-trifluorobenzene is prepared. Physical parameters are given in the following table.

Example 8

A liquid-crystal composition consisting of
6% of 1-(3,4-difluorophenyl)-2-(trans-4-n-pentylcyclohexyl)-ethane,
5% of 1-(3,4-difluorophenyl)-2-(trans-4-n-propylcyclohexyl)-ethane,
8% of p-[trans-4-(trans-4-ethylcyclohexyl)-cyclohexyl]-trifluoromethoxybenzene,
10% of p-[trans-4-(trans-4-propylcyclohexyl)-cyclohexyl]-trifluoromethoxybenzene,
8% of p-[trans-4-(trans-4-butylcyclohexyl)-cyclohexyl]-trifluoromethoxybenzene,
10% of p-[trans-4-(trans-4-pentylcyclohexyl)-cyclohexyl]-trifluoromethoxybenzene,
12% of 4'-(trans-4-propylcyclohexyl)-3,4,5-trifluorobiphenyl,
11% of 4'-(trans-4-pentylcyclohexyl)-3,4,5-trifluorobiphenyl,
8% of 1-[trans-4-(trans-4-n-propylcyclohexyl)-cyclohexyl)-3,4,5-trifluorobenzene,
8% of 1-[trans-4-(trans-4-n-pentylcyclohexyl)-cyclohexyl)-3,4,5-trifluorobenzene,
7% of 1-[trans-4-(trans-4-n-ethylcyclohexyl)-cyclohexyl)-3,4,5-trifluorobenzene and
7% of 1-[trans-4-(trans-4-n-butylcyclohexyl)-cyclohexyl)-3,4,5-trifluorobenzene is prepared. Physical parameters are given in the following table.

Example 9

A liquid-crystal composition consisting of
6% of 1-(3,4-difluorophenyl)-2-(trans-4-propylcyclohexyl)ethane
7% of 1-(3,4-difluorophenyl)-2-(trans-4-pentylcyclohexyl)ethane
6% of 1-(3,4-difluorophenyl)-2-(trans-4-heptylcyclohexyl)ethane
6% of p-[trans-4-(trans-4-ethylcyclohexyl)-cyclohexyl]-trifluoromethoxybenzene,
8% of p-[trans-4-(trans-4-propylcyclohexyl)-cyclohexyl]-trifluoromethoxybenzene,
6% of p-[trans-4-(trans-4-butylcyclohexyl)-cyclohexyl]-trifluoromethoxybenzene,
8% of p-[trans-4-(trans-4-pentylcyclohexyl)-cyclohexyl]-trifluoromethoxybenzene,
12% of 4'-(trans-4-propylcyclohexyl)-3,4,5-trifluorobiphenyl,
11% of 4'-(trans-4-pentylcyclohexyl)-3,4,5-trifluorobiphenyl,
8% of 1-[trans-4-(trans-4-n-propylcyclohexyl)-cyclohexyl)-3,4,5-trifluorobenzene,
8% of 1-[trans-4-(trans-4-n-pentylcyclohexyl)-cyclohexyl)-3,4,5-trifluorobenzene,
7% of 1-[trans-4-(trans-4-n-ethylcyclohexyl)-cyclohexyl)-3,4,5-trifluorobenzene and
7% of 1-[trans-4-(trans-4-n-butylcyclohexyl)-cyclohexyl)-3,4,5-trifluorobenzene, is prepared. Physical parameters are given in the following table.

Example 10

A liquid-crystal composition consisting of
trans-1-p-fluorophenyl-4-n-pentylcyclohexane,
trans-1-p-fluorophenyl-4-n-heptylcyclohexane,
p-[trans-4-(trans-4-ethylcyclohexyl)-cyclohexyl]-trifluoromethoxybenzene,
p-[trans-4-(trans-4-propylcyclohexyl)-cyclohexyl]-trifluoromethoxybenzene,
p-[trans-4-(trans-4-butylcyclohexyl)-cyclohexyl]-trifluoromethoxybenzene,
p-[trans-4-(trans-4-pentylcyclohexyl)-cyclohexyl]-trifluoromethoxybenzene,
1-[trans-4-(trans-4-propylcyclohexyl)-cyclohexyl]-2-(3,4-difluorophenyl)-ethane,
1-[trans-4-(trans-4-pentylcyclohexyl)-cyclohexyl]-2-(3,4-difluorophenyl)-ethane,
4'-(trans-4-propylcyclohexyl)-3,4,5-trifluorobiphenyl,
4'-(trans-4-pentylcyclohexyl)-3,4,5-trifluorobiphenyl,
1-[trans-4-(trans-4-n-propylcyclohexyl)-cyclohexyl)-3,4,5-trifluorobenzene and
1-[trans-4-(trans-4-n-pentylcyclohexyl)-cyclohexyl)-3,4,5-trifluorobenzene is prepared. Physical parameters are given in the following table.

Example 11

A liquid-crystal composition consisting of
4 % of trans-1-p-fluorophenyl-4-n-pentylcyclohexane,
4 % of trans-1-p-fluorophenyl-4-n-heptylcyclohexane,
7 % of p-[trans-4-(trans-4-ethylcyclohexyl)-cyclohexyl]-trifluoromethoxybenzene,
7 % of p-[trans-4-(trans-4-propylcyclohexyl)-cyclohexyl]-trifluoromethoxybenzene, 7 % of p-[trans-4-(trans-4-butylcyclohexyl)-cyclohexyl]-trifluoromethoxybenzene,
8 % of p-[trans-4-(trans-4-pentylcyclohexyl)-cyclohexyl]-trifluoromethoxybenzene,
8 % of 1-[trans-4-(trans-4-propylcyclohexyl)-cyclohexyl]-2-(3,4-difluorophenyl)-ethane,
8 % of 1-[trans-4-(trans-4-pentylcyclohexyl)-cyclohexyl]-2-(3,4-difluorophenyl)-ethane,
14 % of 4'-(trans-4-propylcyclohexyl)-3,4,5-trifluorobiphenyl,
13 % of 4'-(trans-4-pentylcyclohexyl)-3,4,5-trifluorobiphenyl,
9 % of 1-[trans-4-(trans-4-n-propylcyclohexyl)-cyclohexyl]-3,4,5-trifluorobenzene,
9 % of 1-[trans-4-(trans-4-n-pentylcyclohexyl)-cyclohexyl]-3,4,5-trifluorobenzene and
2 % of 4,4'-Bis-(trans-4-propylcyclohexyl)-2-fluorobiphenyl
is prepared. Physical parameters are given in the following table.

Example 12

A liquid-crystal composition consisting of
8% of trans-1-p-fluorophenyl-4-n-pentylcyclohexane,
6% of trans-1-p-fluorophenyl-4-n-heptylcyclohexane,
6% of p-[trans-4-(trans-4-ethylcyclohexyl)-cyclohexyl]-trifluoromethoxybenzene,
7% of p-[trans-4-(trans-4-propylcyclohexyl)-cyclohexyl]-trifluoromethoxybenzene,
6% of p-[trans-4-(trans-4-butylcyclohexyl)-cyclohexyl]-trifluoromethoxybenzene,
6% of p-[trans-4-(trans-4-pentylcyclohexyl)-cyclohexyl]-trifluoromethoxybenzene,
8% of 1-[trans-4-(trans-4-propylcyclohexyl)-cyclohexyl]-2-(3,4-difluorophenyl)-ethane,
8% of 1-[trans-4-(trans-4-pentylcyclohexyl)-cyclohexyl]-2-(3,4-difluorophenyl)-ethane,
4% of 4'-(trans-4-propylcyclohexyl)-3,4,5-trifluorobiphenyl,
13% of 4'-(trans-4-pentylcyclohexyl)-3,4,5-trifluorobiphenyl,
9% of 1-[trans-4-(trans-4-n-propylcyclohexyl)-cyclohexyl]-3,4,5-trifluorobenzene and
9% of 1-[trans-4-(trans-4-n-pentylcyclohexyl)-cyclohexyl]-3,4,5-trifluorobenzene
is prepared. Physical parameters are given in the following table.

Example 13

A liquid-crystal composition consisting of
trans-1-p-fluorophenyl-4-n-pentylcyclohexane,
trans-1-p-fluorophenyl-4-n-heptylcyclohexane,
p-[trans-4-(trans-4-propylcyclohexyl)-cyclohexyl]-trifluoromethoxybenzene,
p-[trans-4-(trans-4-pentylcyclohexyl)-cyclohexyl]-trifluoromethoxybenzene,
1-[trans-4-(trans-4-propylcyclohexyl)-cyclohexyl]-2-(3,4-difluorophenyl)-ethane,
1-[trans-4-(trans-4-pentylcyclohexyl)-cyclohexyl]-2-(3,4-difluorophenyl)-ethane,
4'-(trans-4-propylcyclohexyl)-3,4,5-trifluorobiphenyl,
4'-(trans-4-pentylcyclohexyl)-3,4,5-trifluorobiphenyl,
4-[trans-4-(trans-4-propylcyclohexyl)-cyclohexyl]-2-fluoro-trifluoromethoxybenze and
1-[trans-4-(trans-4-n-pentylcyclohexyl)-cyclohexyl)-3,4,5-trifluorobenzene
is prepared. Physical parameters are given in the following table.

Example 14

A liquid-crystal composition consisting of
1-(trans-4-pentylcyclohexyl)-2-(3,4-difluorophenyl)ethane,
p-[trans-4-(trans-4-propylcyclohexyl)-cyclohexyl]-trifluoromethoxybenzene,
1-(trans-4-propylcyclohexyl)-2-[trans-4-(3,4-difluorophenyl)-cyclohexyl]-ethane,
1-(trans-4-pentylcyclohexyl)-2-[trans-4-(3,4-difluorophenyl) -cyclohexyl]-ethane,
p-[trans-4-(trans-4-pentylcyclohexyl)-cyclohexyl]-trifluoromethoxybenzene,
4'-(trans-4-propylcyclohexyl)-3,4,5-trifluorobiphenyl,
4'-(trans-4-pentylcyclohexyl)-3,4,5-trifluorobiphenyl,
1-[trans-4-(trans-4-n-propylcyclohexyl)-cyclohexyl)-3,4,5-trifluorobenzene and
1[trans-4-(trans-4-n-pentylcyclohexyl)-cyclohexyl)-3,4,5-trifluorobenzene
is prepared. Physical parameters are given in the following table.

Example 15

A liquid-crystal composition consisting of
11 % of 1-(trans-4-pentylcyclohexyl)-2-(3,4-difluorophenyl)ethane,
11 of p-[trans-4-(trans-4-propylcyclohexyl)-cyclohexyl]-trifluoromethoxybenzene,
12 % of 1-(trans-4-propylcyclohexyl)-2-[trans-4-(3,4-difluorophenyl)-cyclohexyl]-ethane,
10 % of 1-(trans-4-pentylcyclohexyl)-2-[trans-4-(3,4-difluorophenyl)-cyclohexyl]-ethane,
12 % of p-[trans-4-(trans-4-pentylcyclohexyl)-cyclohexyl]-trifluoromethoxybenzene,
12 % of 4'-(trans-4-propylcyclohexyl)-3,4,5-trifluorobiphenyl,
10% of 4'-(trans-4-pentylcyclohexyl)-3,4,5-trifluorobiphenyl,
11 % of 1-[trans-4-(trans-4-n-propylcyclohexyl)-cyclohexyl)-3,4,5-trifluorobenzene and
10 of 1-[trans-4-(trans-4-n-pentylcyclohexyl)-cyclohexyl)-3,4,5-trifluorobenzene
is prepared. Physical parameters are given in the following table.

Example 16

A liquid-crystal composition consisting of
5 % of 1-(trans-4-propylcyclohexyl)-2-(3,4-difluorophenyl)ethane,
6 % of 1-(trans-4-pentylcyclohexyl)-2-(3,4-difluorophenyl)ethane,
11 of p-[trans-4-(trans-4-ethylcyclohexyl)-cyclohexyl]-trifluoromethoxybenzene,
12 % of p-[trans-4-(trans-4-propylcyclohexyl)-cyclohexyl]-trifluoromethoxybenzene,
10 % of p-[trans-4-(trans-4-butylcyclohexyl)-cyclohexyl]-trifluoromethoxybenzene,
12 % of p-[trans-4-(trans-4-pentylcyclohexyl)-cyclohexyl]-trifluoromethoxybenzene,
12 % of 4'-(trans-4-propylcyclohexyl)-3,4,5-trifluorobiphenyl,
11 % of 4'-(trans-4-pentylcyclohexyl)-3,4,5-trifluorobiphenyl,
12 % of 1-[trans-4-(trans-4-n-propylcyclohexyl)-cyclohexyl)-3,4,5-trifluorobenzene and
9 of 1-[trans-4-(trans-4-n-pentylcyclohexyl)-cyclohexyl)-3,4,5-trifluorobenzene is prepared. Physical parameters are given in the following table.

TABLE

| Physical parameters of Compositions of Examples 1 to 16 | | | | | | | | |
|---|---|---|---|---|---|---|---|---|
| | Example 1 | Example 2 | Example 3 | Example 4 | Example 5 | Example 6 | Example 7 | Example 8 |
| Clearing point (°C.) | +85° | +77° | +84° | +91° | +82° | +81° | +81° | +76° |
| Viscosity (mm$^2 \cdot $s$^{-1}$) at 20° C. | 18 | — | — | — | — | — | — | — |
| Δn (20° C., 589 nm) | 0.092 | 0.089 | 0.092 | 0.094 | 0.093 | 0.091 | 0.088 | 0.091 |
| V$_{10,0,20}$ (d · Δn = 0.4μ) | 1.58 | 1.49 | 1.64 | 1.71 | 1.55 | 1.46 | 1.40 | 1.30 |
| S→N (°C.) | <−40° | — | — | — | — | — | — | — |
| | Example 9 | Example 10 | Example 11 | Example 12 | Example 13 | Example 14 | Example 15 | Example 16 |
| Clearing point (°C.) | +62° | +73° | +92° | +77° | +89° | +78° | +79° | +86° |
| Viscosity (mm$^2 \cdot $s$^{-1}$) at 20° C. | — | — | — | — | — | — | — | 17 |
| Δn (20° C., 589 nm) | 0.092 | 0.0879 | 0.0928 | 0.0893 | 0.0960 | 0.0930 | 0.0910 | 0.0920 |
| V$_{10,0,20}$ (d · Δn = 0.4μ) | 1.25 | 1.56 | 1.68 | 1.49 | 1.73 | 1.65 | 1.49 | 1.50 |
| S→N (°C.) | — | — | — | — | — | — | — | — |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A nematic liquid-crystal composition based on terminally and laterally fluorinated compounds, comprising about 8 to 60% by weight of one or more compounds from group 1:

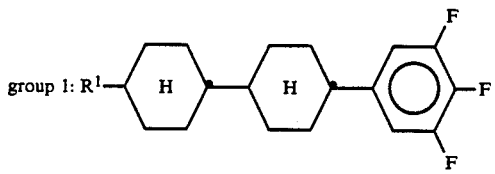

wherein R$^1$ denotes a straight-chain alkyl group of 2 to 7 carbon atoms, about 6 to 80% by weight of one or more compounds from group 2:

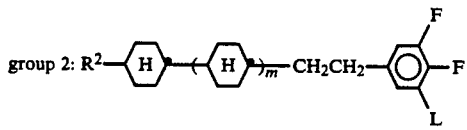

wherein R$^2$ denotes a straight-chain alkyl group of 2 to 7 carbon atoms, L is H or F and m is 1 or 0, about 8 to 60% by weight of one or more compounds from group 3:

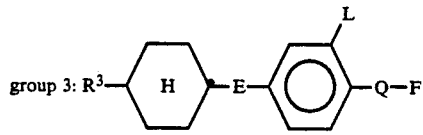

wherein R$^3$ denotes a straight-chain alkyl group of 2 to 7 carbon atoms, E is

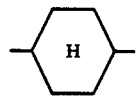

and L is H or F and Q is OCF$_2$, OCFH, OCFC$_1$ or a single bond, and 0 to 60% by weight of one or more compounds from group 4:

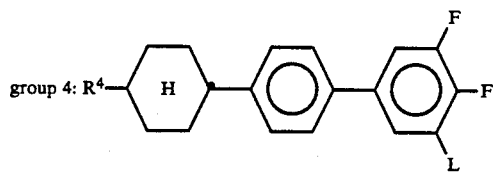

wherein R$^4$ denotes a straight-chain alkyl group of 2 to 7 carbon atoms and L is H or F.

2. A nematic liquid-crystal composition according to claim 1, comprising one or more compounds from group 1 in a total percentage of more than 12% by weight.

3. A nematic liquid-crystal composition according to claim 1, comprising two, three or four compounds from group 1.

* * * * *